Aug. 27, 1929.   F. JOHANNSEN   1,725,865
METHOD OF PRODUCING METALLIC SULPHATES
Filed July 6, 1927
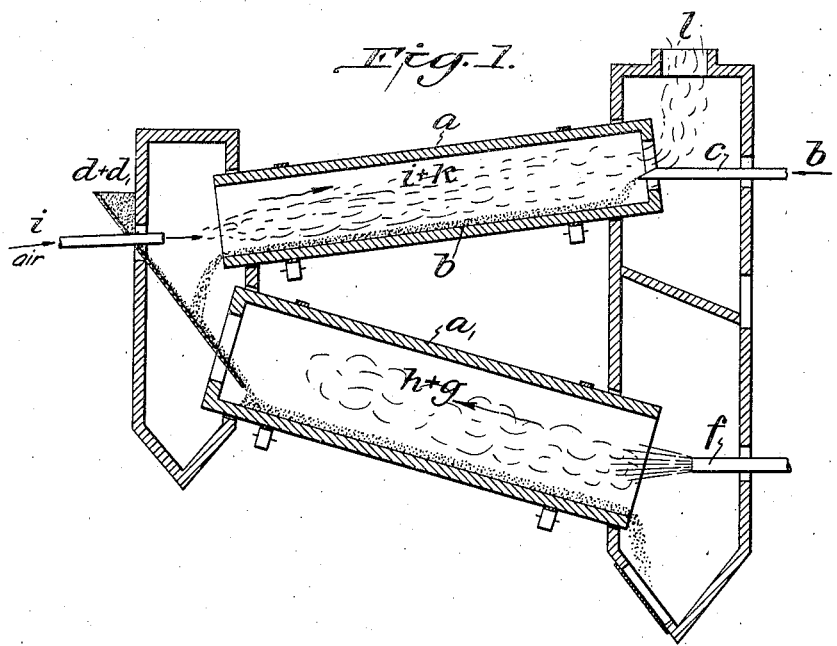
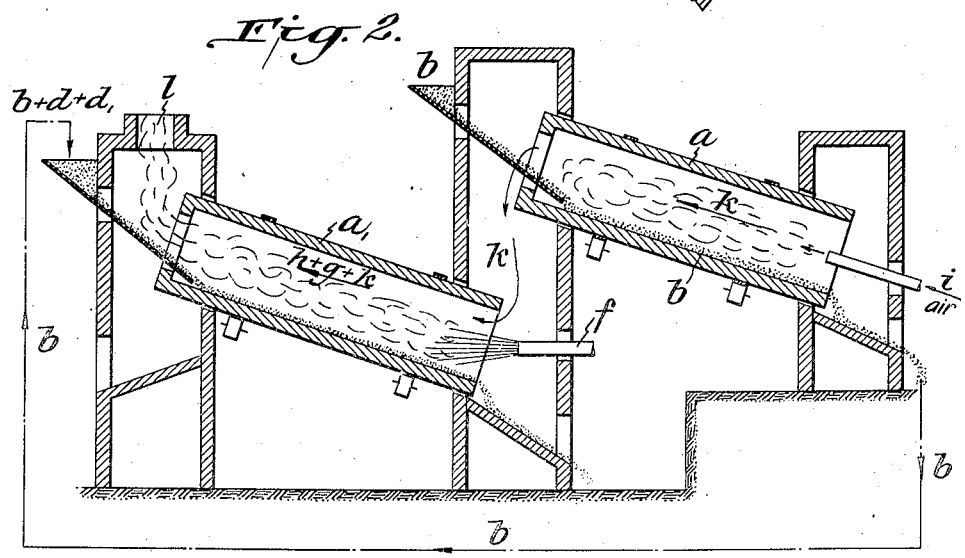
$b$ = ore
$d$ = coke
$d_1$ = lime, etc.
$g$ = combustion gases
$h$ = $CO_2$ + metal oxide
$i$ = air
$k$ = gases containing oxides of sulfur
Inventor:
Friedrich Johannsen
By Byrnes Townsend Brickenstein
Attorneys Patented Aug. 27, 1929.

1,725,865

UNITED STATES PATENT OFFICE.

FRIEDRICH JOHANNSEN, OF MAGDEBURG-BUCKAU, GERMANY, ASSIGNOR TO THE FIRM: FRIED. KRUPP GRUSONWERK AKTIENGESELLSCHAFT, OF MAGDEBURG-BUCKAU, GERMANY.

METHOD OF PRODUCING METALLIC SULPHATES.

Application filed July 6, 1927, Serial No. 203,875, and in Germany July 12, 1926.

This invention relates to a process for the production of metals from sulphidic ores and metallurgical products, and particularly for the production of zinc sulphate from the corresponding sulphidic ores and metallurgical products.

It is well known to produce a zinc sulphate electrolyte adapted for use in the production of electrolytic zinc by extensively roasting ores, or metallurgical products, containing zinc with or without other volatile metals, such as for instance, lead and the like, either as sulphides of the metals or in the form of other sulphur-containing compounds thereof, whereby to produce the purest possible oxidation product, subjecting the so-obtained oxidation product to a distillation process whereby to liberate from the non-volatile residue the oxides of the volatile metals in the form of an oxidic fume and lixiviating the so-obtained oxidic fume with an acid, such as for example, sulphuric acid. The sulphur dioxide gas liberated, during the roasting process, from materials containing only relatively small amounts of sulphur must be rendered innocuous by costly means; the sulphur dioxide liberated from materials relatively rich in sulphur generally is converted, at least in part, into sulphuric acid.

An object of the present invention is to provide a procedure whereby the sulphur dioxide either is made to perform useful work,—thus increasing the economy of the process for the preparation of a suitable lixiviation product,—or is rendered innocuous, in a simple manner and without prohibitive costs.

According to the present invention the sulphidic starting materials (e. g., sulphidic zinc ores and/or sulphidic zinc-containing metallurgical products) are subjected to an initial roasting operation in a pure oxidizing atmosphere in a suitable roasting furnace, such as for instance a revolving tube furnace, heated by any sort of flame, for the purpose of effecting only partial elimination of the sulphur content of the materials in the form of sulphur dioxide. While in the accompanying description and drawing the rotary kiln is referred to, the process can be carried out in other well-known types of roasting furnaces. The resulting product, partially freed from sulphur, is then immediately subjected to a combined roasting and distilling operation,—in a revolving tube furnace or an equivalent roasting apparatus,—with addition of any suitable reducing agents and with the further addition of sulphur-binding agents, for instance alkaline earth metal compounds, such as lime, limestone, magnesite, dolomite, or the like whereby the residual content of sulphur is bound in the non-volatile residue as a sulphide while the volatile metals are liberated in the form of an oxidic fume. The gases from the initial oxidation roasting treatment, containing sulphur dioxide, are conducted into the presence of, and over, the material undergoing the combined reduction roasting and distilling treatment,—or, inversely, the gases from the combined reduction roasting and distilling treatment are conducted, with addition of air, into the presence of, and over, the material undergoing the initial oxidation roasting treatment,—whereby to convert a substantial portion, or all, of the distillation products into sulphates. The fume thus obtained finally is lixiviated with a suitable acid, such as for example sulphuric acid,—preferably, dilute sulphuric acid,—whereby there is obtained, in the case of a zinc bearing fume, a zinc sulphate electrolyte suitable for use in the electro-deposition of zinc.

By the carrying out of the above-described procedure,—involving an initial oxidation roasting treatment and subsequent reduction roasting and distilling treatment in the presence of sulphur binding agents, with contact of the gases from the one operation with the material under treatment in the other,—a product very suitable for lixiviation is obtained, which product, contrasted with the oxidic product obtained by the carrying out of the hitherto-known process, has the economic advantage that the consumption of acid in the ensuing lixiviation operation is materially lessened by virtue of the fact that a material portion of the metallic content of the fume already is in the form of sulphates.

The purpose of this procedure,—involving the partial oxidation of the sulphur content of the sulphidic starting material and the partial binding of sulphur in the non-volatile residue,—is to obtain, from material rich in sulphur, a sufficient quantity of sulphur dioxide for the formation of a lixiviation product which is rich in sulphates, without allowing the escape of the surplus sulphur, in the form of sulphur dioxide, with the waste gases. The extent of the roasting operation as well as the quantity of the sulphur binding agent necessary for the binding of the surplus sulphur depend, of course, wholly upon the sulphur, and volatile metals, content of the particular starting material. The carrying out of the procedure according to the present invention assures, no matter what happens to be the sulphur content of the starting material, the substantially complete absence of sulphur dioxide in the waste gases going to the stack.

Apparatus for carrying out the above described process is diagrammatically shown in the accompanying drawings in which Fig. 1 shows an apparatus for carrying out one method, and Fig. 2 shows an apparatus for carrying out the modified method. In each figure, the same reference letters are used to refer to like parts. Referring to Fig. 1, $a$ is a roasting furnace, shown as a rotary kiln, into which the sulphidic material $b$ is delivered by a suitable feeding spout $c$. The material as it progresses over the wall of the furnace is partially roasted in the presence of air $i$, delivered through the pipe shown, whereby are produced gases $k$, containing $SO_2$ and/or $SO_3$. The roasted ore, partially freed from its sulphur content, is then delivered directly to the kiln $a'$ into which are also fed, through any suitable means, a reducing agent $d$, such as coke, and an alkaline earth metal compound $d'$, such as lime or limestone. A heating flame $f$ serves to furnish any additional heat needed in case that furnished by combustion of the liberated metallic vapors to metallic oxides and carbon to $CO_2$, is not sufficient. In this furnace $a'$, the reactions which occur may be written as follows:

$CaCO_3 \rightarrow CaO + CO_2$.

$CaO$ + metallic sulphide $\rightarrow CaS$ + metallic oxide.

Metallic oxide + $C \rightarrow CO$ + metal (in vapor form).

$CO$ + metal vapor is liberated from the charge.

$CO$ + metal + $O_2 \rightarrow CO_2$ + metal oxide.

The combustion gases $g$ from the burner $f$, as well as the reaction gases and metal vapors $h$, are delivered with the addition of fresh air $i$, into the roasting furnace $a$, in which they are oxidized under the action of the heat of the roasting furnace and the contact effect of the red-hot metal oxides and furnace wall. A greater part of the $SO_2$ is oxidized to $SO_3$, which combines with the metal oxide, present in dust form in the gases, to form a metal sulphate. This transformation of metal oxide + $SO_2$ in exit gases, is well-known to occur in other metallurgical processes. Thus, for example, in the Bessemerizing of zinc-containing copper matte, a portion of the zinc is volatilized and recovered as zinc sulphate, although the production of sulphate in the converter itself is impossible at the temperatures existing therein.

From the furnace $a$ the resulting fume-containing gases pass out through the stack $l$ to a suitable collecting apparatus, such as an electrical precipitator.

The method carried out in the apparatus shown in Fig. 2 will be readily understood from the foregoing description. The sulphur-containing gases $k$, formed in the primary oxidation process carried out in the kiln $a$, are delivered into the kiln $a'$ through which they pass in contact with the combustion gases $g$ and the reduction gases and metal vapor $h$. The fume-containing gases pass out through the stack $l$ and are collected.

In this form of apparatus, the partially roasted charge $b$, is, as indicated by the dotted line, delivered into a hopper where it, together with reducing material $d$ and lime or limestone $d'$, is fed into the reducing and volatilizing furnace.

As a specific example of the operation of the process, an ore containing 29% sulphur and 18% zinc was treated. In the primary roasting process, the sulphur was roasted down to 18% and the still hot clinker delivered immediately to the second furnace. Simultaneously, to take care of the reduction of the charge, there were added about 25% of coke and 30% of limestone, the latter serving to bind the sulphur in a heat resistant form as a sulphide. The reaction gases, laden with zinc oxide dust, as they leave the reducing furnace $a'$, contain about 16% $CO_2$, 2–3% $O$, and 0.–0.3% $CO$, from which it is apparent that there is a practically complete utilization of the heat of combustion of the $CO$ and metal vapors produced in this volatilization furnace. For carrying out the roasting process in the roasting furnace, there is added about 100% of fresh air $i$, so that the air passing the furnace contains about 9–10% of oxygen. The quantity of sulphur coming from the roasted charge is sufficient to transform all the zinc into zinc sulphate, so that only a small $SO_2$ content is found in the exit gases. The zinc sulphate suspended in the gases and containing only a small quantity of zinc oxide, may be precipitated in the electrical precipitator, and is then ready for lixiviation.

If lead is present with the zinc in the starting material, lead sulphate also is formed by the combined reduction roasting and distilling treatment above described. This lead sulphate remains as an insoluble residue during the lixiviating operation and can easily be worked over into substantially pure metal since it is practically free of zinc and other impurities.

I claim:

1. Process for the treatment of sulphidic ores and metallurgical products which comprises subjecting the same to an initial oxidizing roasting treatment whereby to eliminate a part of the sulphur content thereof as sulphur dioxide, subjecting the resulting product to a combined reducing roasting and distilling treatment in the presence of an alkaline earth metal compound whereby to liberate a distillation product and causing the sulphur dioxide-containing gases from the oxidizing roasting treatment to react with the distillation product of the combined reducing roasting and distilling treatment whereby to produce sulphates.

2. Process for the treatment of sulphidic ores and metallurgical products containing zinc which comprises subjecting the same to an initial oxidizing roasting treatment whereby to eliminate a part of the sulphur content thereof as sulphur dioxide, subjecting the resulting zinc-containing product to a combined reducing roasting and distilling treatment in the presence of an alkaline earth metal compound whereby to liberate a zinc-containing distillation product and causing the sulphur dioxide-containing gases from the oxidizing roasting treatment to react with the zinc-containing distillation product of the combined reducing roasting and distilling treatment whereby to produce zinc sulphate.

In testimony whereof, I affix my signature.

FRIEDRICH JOHANNSEN.